United States Patent
Yoo

(10) Patent No.: US 12,403,359 B2
(45) Date of Patent: Sep. 2, 2025

(54) SENSOR MODULE AND WEIGHT EXERCISE APPARATUS INCLUDING THE SAME

(71) Applicant: DRAX INC., Anyang-si (KR)

(72) Inventor: Seon Kyung Yoo, Seoul (KR)

(73) Assignee: DRAX INC., Anyang-si (KR)

( * ) Notice: Subject to any disclaimer, the term of this patent is extended or adjusted under 35 U.S.C. 154(b) by 209 days.

(21) Appl. No.: 18/089,033

(22) Filed: Dec. 27, 2022

(65) Prior Publication Data

US 2023/0201664 A1    Jun. 29, 2023

(30) Foreign Application Priority Data

Dec. 28, 2021   (KR) .................... 10-2021-0190356
Nov. 14, 2022   (KR) .................... 10-2022-0151983

(51) Int. Cl.
*A63B 24/00* (2006.01)
*A63B 21/062* (2006.01)
(Continued)

(52) U.S. Cl.
CPC ...... *A63B 24/0062* (2013.01); *A63B 21/0628* (2015.10); *G01S 17/08* (2013.01);
(Continued)

(58) Field of Classification Search
CPC ............. A63B 21/0628; A63B 21/063; A63B 24/0062; A63B 2071/0658;
(Continued)

(56) References Cited

U.S. PATENT DOCUMENTS 6,358,188 B1   3/2002   Ben-Yehuda et al.
9,982,997 B2   5/2018   Feng et al.
(Continued)

FOREIGN PATENT DOCUMENTS

CN    105492860 A    4/2016
CN    110339548 A    10/2019
(Continued)

OTHER PUBLICATIONS

Korean Office Action dated Jul. 17, 2024 in Application No. 10-2022-0151983.
(Continued)

*Primary Examiner* — Megan Anderson
(74) *Attorney, Agent, or Firm* — Sughrue Mion, PLLC

(57) ABSTRACT

Provided is a weight exercise apparatus. The weight exercise apparatus includes an exercise main body in which movement is generated according to a user's weight exercise, a sensor module configured to detect movement of the exercise main body, and a processor configured to control a user interface (UI) unit to display a UI element indicating an exercise state of a user corresponding to the detected movement on a UI screen wherein the sensor module includes a first laser sensor configured to irradiate a first laser beam toward the weight plate or a component moving together with the weight plate to detect a moving distance of the weight plate when the weight plate moves and a second laser sensor configured to irradiate a second laser beam toward a component that does not move in spite of movement of the weight plate when the weight plate moves.

13 Claims, 19 Drawing Sheets

(51) Int. Cl.
  *A63B 71/06* (2006.01)
  *G01S 17/08* (2006.01)
  *G01S 17/58* (2006.01)
(52) U.S. Cl.
  CPC ....... *G01S 17/58* (2013.01); *A63B 2071/0658* (2013.01); *A63B 2220/20* (2013.01); *A63B 2220/805* (2013.01); *A63B 2220/833* (2013.01)
(58) Field of Classification Search
  CPC .......... A63B 2071/065; A63B 2220/20; A63B 2220/805; A63B 2220/833; A63B 2220/13; A63B 2220/52; A63B 2220/65; A63B 2220/72; A63B 2220/75; A63B 2225/02; A63B 2225/50; G01S 17/08; G01S 17/58
  See application file for complete search history.

(56) References Cited

U.S. PATENT DOCUMENTS

| | | | |
|---|---|---|---|
| 10,898,758 B2 | 1/2021 | Bengtsson et al. | |
| 11,511,156 B2 * | 11/2022 | Shavit | A61B 5/1123 |
| 2003/0032529 A1 | 2/2003 | Alessandri et al. | |
| 2010/0179005 A1 | 7/2010 | Meadows et al. | |
| 2015/0226841 A1 | 8/2015 | Lüthi et al. | |
| 2018/0250553 A1 | 9/2018 | Pendergast et al. | |
| 2021/0402256 A1 * | 12/2021 | Huch | A63B 24/0062 |
| 2023/0201664 A1 * | 6/2023 | Yoo | A63B 21/0628 482/8 |
| 2024/0408450 A1 * | 12/2024 | Yoo | H04W 4/70 |
| 2024/0408451 A1 * | 12/2024 | Yoo | A63B 24/00 |

FOREIGN PATENT DOCUMENTS

| | | |
|---|---|---|
| JP | 2019-516438 A | 6/2019 |
| KR | 10-2021-0046447 A | 4/2021 |

OTHER PUBLICATIONS

Extended European Search Report issued May 17, 2023, in Application No. 22216529.2.

Chinese Office Action dated Sep. 6, 2024 in Application No. 202211686904.5.

* cited by examiner

SENSOR MODULE AND WEIGHT EXERCISE APPARATUS INCLUDING THE SAME

CROSS-REFERENCE TO RELATED APPLICATIONS

This application is based on and claims priority under 35 U.S.C. § 119 to Korean Patent Application No. 10-2021-0190356, filed on Dec. 28, 2021 and Korean Patent Application No. 10-2022-0151983, filed on Nov. 14, 2022, in the Korean Intellectual Property Office, the disclosures of which are incorporated by reference herein in their entireties.

BACKGROUND

1. Field

The disclosure relates to a sensor module and a weight exercise apparatus including the same.

2. Description of the Related Art

Generally, as the standard of living improves, interest in health is gradually increasing, and thus many people use various types of weight exercise apparatuses to improve physical strength.

The weight exercise apparatuses have been provided in various forms depending on a body part to be improved in muscular strength, a purpose of use, etc., and are intended to train an upper body and a lower body mainly using hands or feet. Various types of weight exercise apparatuses, such as shoulder presses, bench presses, abdominal machines, butterfly machines, arm curl machines, etc., have been used depending on the body part to be improved in its muscle strength.

The weight exercise apparatus is installed such that a plurality of weight plates in a block form overlap each other, and the weight exercise apparatus may include a pin structure for selecting some of the plurality of weight plates. A user may use the pin structure to select the number of weight plates or a weight of a weight plate to be lifted. The user may exercise by moving a selected weight through an exercise structure of exercise equipment.

However, when exercising using a weight exercise apparatus, the user may have a difficulty in accurately identifying an exercise state and may not be given exact motivation such as an exercise goal, making it difficult to expect improvement in the exercise effect.

SUMMARY

To improve the user's exercise effect, an apparatus may be considered which may identify an exercise state such as an exercise speed, an exercise amount, etc., during an exercise of the user or after termination of the exercise of the user. As an example for this end, adoption of a sensor module to measure the exercise state of the user and a user interface unit to display information measured by the sensor module may be considered.

However, when measurement of the sensor module is incorrect, the user's exercise state may not be accurately identified, actually lowering the user's motivation.

Provided are a sensor module capable of accurate measurement to efficiently guide a user's weight exercise and a weight exercise apparatus including the sensor module.

Additional aspects will be set forth in part in the description which follows and, in part, will be apparent from the description, or may be learned by practice of the presented embodiments of the disclosure.

According to an aspect of the disclosure, a weight exercise apparatus includes an exercise main body including a plurality of weight plates which are movable, a sensor module configured to detect movement of a weight plate of the exercise main body, a user interface (UI) unit configured to output a UI screen, a memory storing at least one instruction, and a processor configured to control the UI unit to display a UI element indicating an exercise state of a user corresponding to the detected movement on the UI screen, by executing the at least one instruction, in which the sensor module includes a first laser sensor configured to irradiate a first laser beam toward the weight plate or a component moving together with the weight plate to detect a moving distance of the weight plate when the weight plate moves and a second laser sensor configured to irradiate a second laser beam toward a component that does not move in spite of movement of the weight plate when the weight plate moves.

The first laser sensor may be arranged to irradiate the first laser beam toward a pin structure for weight setting of the weight exercise apparatus.

The first laser sensor may be arranged to irradiate the first laser beam toward a top surface of the weight plate.

The second laser sensor may be installed on the exercise main body.

The exercise main body may further include a frame structure supporting the plurality of weight plates to allow the plurality of weight plates to move, and the second laser sensor may be arranged to irradiate the second laser beam toward a fixed region in the frame structure.

The processor may be further configured to control the UI unit to display the UI element on the UI screen according to information detected by the first laser sensor based on whether a position of the weight plate moves, by executing the at least one instruction.

The processor may be further configured to, by executing the at least one instruction, determine a compensation factor by calculating an amount of change of a second detected distance detected by the second laser sensor and determine a position of the weight plate by reflecting the determined compensation factor in a first detected distance detected by the first laser sensor.

When surrounding environmental conditions of the sensor module change, a first detected distance detected by the first laser sensor may change and a second detected distance detected by the second laser sensor may change, and a change rate of the first detected distance of the first laser sensor may be equal to a change rate of the second detected distance of the second laser sensor.

When surrounding environmental conditions of the sensor module change, a first detected distance detected by the first laser sensor may change and a second detected distance detected by the second laser sensor may change, and an amount of change of the first detected distance of the first laser sensor may be equal to an amount of change of the second detected distance of the second laser sensor.

The surrounding environmental conditions may include an ambient temperature or an ambient humidity of the sensor module.

The first laser sensor and the second laser sensor may have identical specifications.

The first laser sensor and the second laser sensor may have an identical measurement accuracy.

According to another aspect of the disclosure, a sensor module to detect movement of a measurement target includes a first laser sensor configured to irradiate a first laser beam toward the measurement target or a component moving together with the measurement target to measure movement of the measurement target when the measurement target moves and a second laser sensor configured to irradiate a second laser beam toward a component that does not move in spite of movement of the measurement target when the measurement target moves.

According to another aspect of the disclosure, a weight exercise apparatus includes an exercise main body including a plurality of weight plates which are movable, a sensor module configured to detect movement of a weight plate of the exercise main body, a user interface (UI) unit configured to output a UI screen, a memory storing at least one instruction, and a processor configured to control the UI unit to display a UI element indicating an exercise state of a user corresponding to the detected movement on the UI screen, by executing the at least one instruction, in which the sensor module includes a single laser sensor, the laser sensor including a first sensing mode in which a laser beam is irradiated toward the weight plate or a component moving together with the weight plate to detect a moving distance of the weight plate when the weight plate moves and a second sensing mode in which a laser beam is irradiated toward a component that does not move in spite of movement of the weight plate when the weight plate moves.

The laser sensor may be configured to be movable, and a position in which a laser beam is irradiated in the first sensing mode may be different from a position in which a laser beam is irradiated in the second sensing mode.

The laser sensor may be further configured to irradiate a laser beam in a specific direction, the sensor module may further include a reference plate movable between an interference position interfering with an irradiation path of the laser beam and a deviation position deviating from the irradiation path of the laser beam, the laser sensor may have the first sensing mode when the reference plate is in the deviation position, and the laser sensor may have the second sensing mode when the reference plate is in the interference position.

The exercise main body may further include a frame structure that moves the plurality of weight plates to allow the plurality of weight plates to move and has a fixed region that does not move when the weight plate moves, the laser sensor may be further arranged to irradiate a laser beam toward a pin structure for weight setting of the weight exercise apparatus and to irradiate the laser beam toward the fixed region when the pin structure is separated from the weight plate, and the laser sensor may have the first sensing mode when irradiating the laser beam to the pin structure, and may have the second sensing mode when irradiating the laser beam to the fixed region.

A distance between the fixed region and the laser sensor may be defined as a reference distance, and the processor may be further configured to switch the laser sensor from the first sensing mode to the second sensing mode when a distance detected by the laser sensor corresponds to the reference distance.

Other aspects, features, advantages, and advantages other than those described above will become apparent from the following figures, claims, and the detailed description of the disclosure.

These general and specific aspects may be carried out using a system, a method, a computer program, or any combination of thereof.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
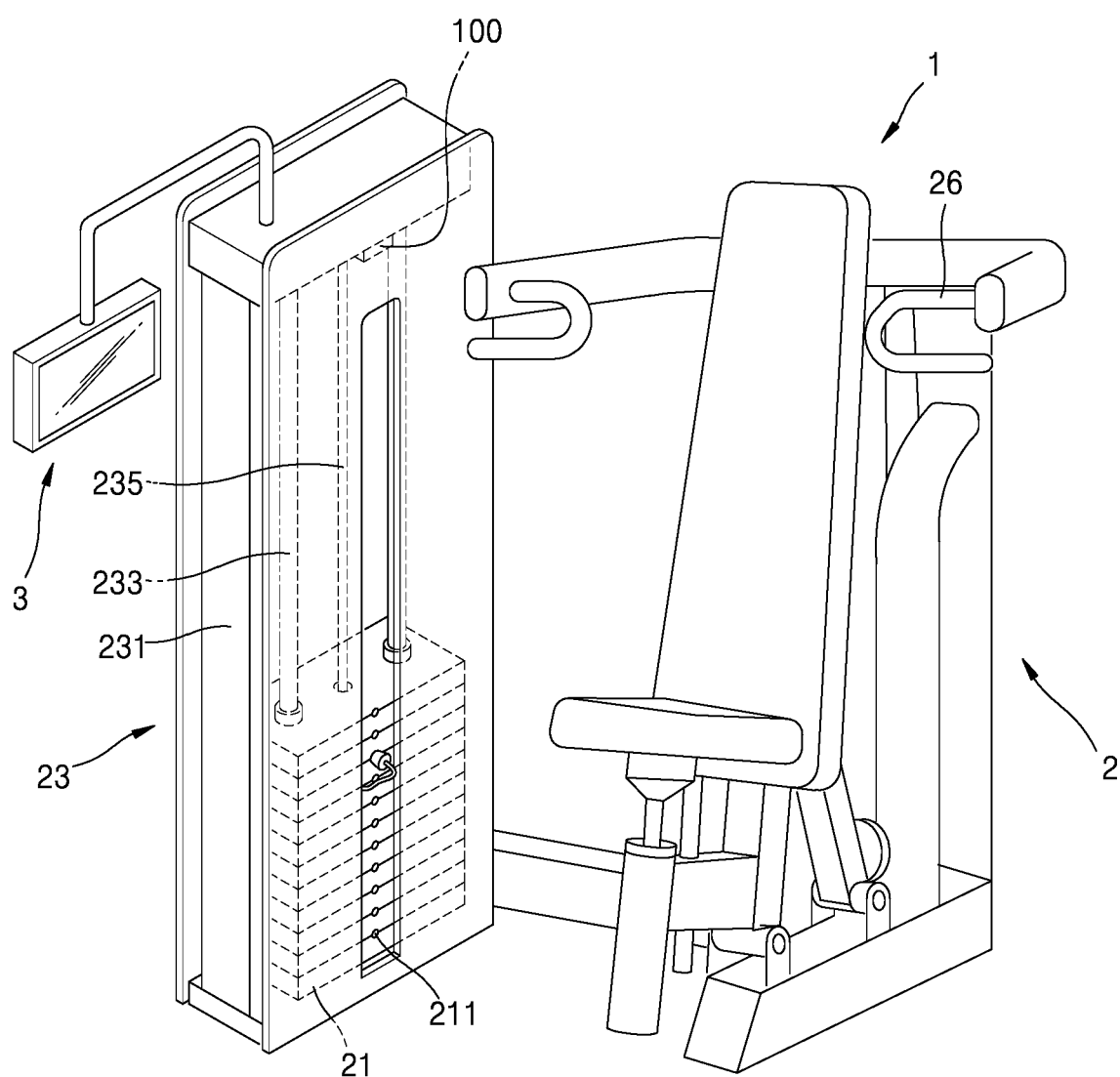
FIG. 1 is a perspective view for describing a weight exercise apparatus according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

Hereinafter, various embodiments will be described in detail with reference to the drawings. Embodiments described below may be changed into various different forms and performed. To more clearly describe characteristics of the embodiments, a detailed description of matters widely known to those of ordinary skill in the art to which the following embodiments belong will be omitted.

Meanwhile, throughout the specification, when any component is "connected" to another component, it may include not only a case where they are 'directly connected', but also a case where they are 'electrically connected with another component therebetween'. When a component "includes" another component, it may mean that the component may further include other components rather than excluding the other component, unless stated otherwise.

In addition, terminology, such as 'first' or 'second' used herein, can be used to describe various components, but the components should not be limited by the terms. These terms are used to distinguish one component from another component.

The term used herein such as 'unit', 'module', etc., indicates a unit for processing at least one function or operation, and may be implemented in hardware, software, or in a combination of hardware and software.

Current embodiments relate to a weight exercise apparatus and a sensor module used therefor, and matters widely known to those of ordinary skill in the art to which the following embodiments belong will not be described in detail.

Figure 2:
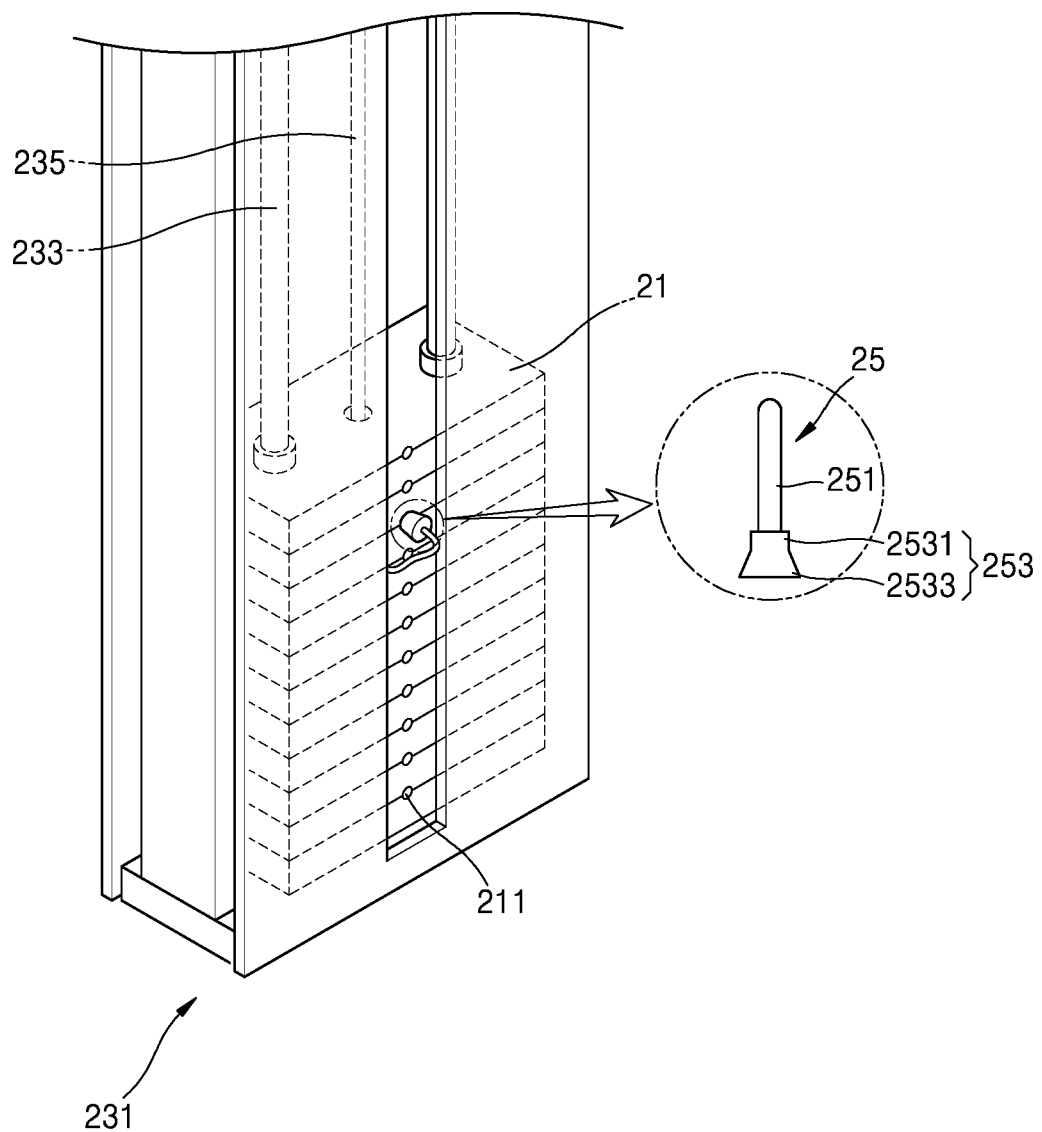
FIG. 2 is a view for describing a structure for setting a weight of a weight exercise apparatus according to an embodiment.
Figure 3:
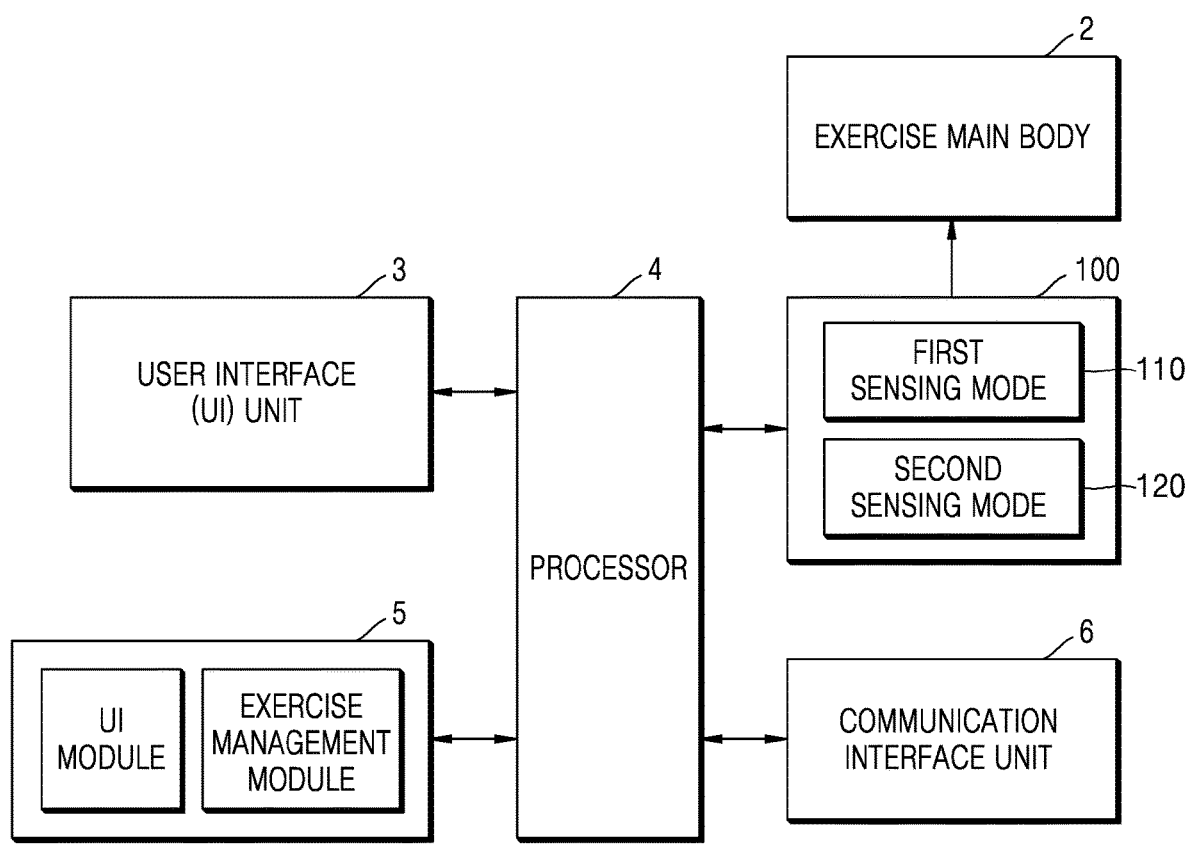
FIG. 3 is a block diagram of a weight exercise apparatus according to an embodiment.

FIG. 1 is a perspective view for describing a weight exercise apparatus 1 according to an embodiment, and FIG. 2 is a view for describing a structure for setting a weight of the weight exercise apparatus 1 according to an embodiment. FIG. 3 is a block diagram of the weight exercise apparatus 1 according to an embodiment.

Referring to FIGS. 1 to 3, the weight exercise apparatus 1 may include an exercise main body 2, a sensor module 100, a user interface (UI) unit 3, and a processor 4.

The exercise main body 2 may be exercise equipment in which movement is generated according to a user's weight exercise. For example, the exercise main body 2 may include a plurality of weight plates 21 and a frame structure 23 supporting the plurality of weight plates 21 to allow the plurality of weight plates 21 to move. The frame structure 23 may support the weight plate 21 such that the weight plate 21 may move in a gravity direction and a direction opposite thereto, e.g., up and down.

Referring to FIG. 2, the exercise main body 2 may include a pin structure 25 for selecting at least some of the plurality of weight plates 21. The pin structure 25 may be inserted into a pin hole 211 to select the weight plate 21 corresponding to a weight desired by a user. The pin hole 211 may be formed by the adjacent weight plate 21. However, arrangement of the pin hole 211 may not be limited thereto and may be various. For example, the pin hole 211 may be formed in each weight plate 21.

The pin structure 25 may include an insertion region 251 to be inserted into the pin hole 211 and a holder region 253 fixed to the insertion region 251. The insertion region 251 of the pin structure 25 may have a shape corresponding to the shape of the pin hole 211. The holder region 253 may include a cylindrical portion 2531 having a constant diameter in an extending direction of the pin structure 25 and a slope portion 2533 extending from the cylindrical portion 2531 and having a diameter changing in an extending direction thereof. However, the shape of the holder region 253 may not be limited thereto and may be changed into various shapes as long as they allow the user to insert the pin structure 25 into the pin hole 211 or remove the pin structure 25 from the pin hole 211.

As the insertion region 251 of the pin structure 25 is inserted into the pin hole 211 of the certain weight plate 21, a weight of the certain weight plate 21 into which the pin structure 25 is inserted and a weight of the weight plate 21 arranged on the certain weight plate 21 may be selected.

The plurality of weight plates 21 may be sequentially stacked in a vertical direction. Each of the plurality of weight plates 21 may have a weight. Weights of the plurality of weight plates 21 may be respectively equal to or different from one another. For example, the weights of the plurality of weight plates 21 may be respectively equal to about 5 kg. In another example, some of the plurality of weight plates 21 may have a weight of about 5 kg, respectively, and the others of the plurality of weight plates 21 may have a weight of about 10 kg, respectively. In addition, the weights of the plurality of weight plates 21 may be various.

The frame structure 23 may include a base frame 231 and a pair of guide rails 233 that extend in the vertical direction to allow the plurality of weight plates 21 to move up and down and are installed on the base frame 231. The pair of guide rails 233 may be arranged to penetrate the plurality of weight plates 21. The frame structure 23 may include a connection line 235 configured to deliver a force applied by the user to the weight plate 21.

In the weight exercise apparatus 1 according to an embodiment, the user may apply a force to an exercise structure 26 to move the weight plate 21 corresponding to the selected weight in a direction opposite to the gravity direction or in the gravity direction. The exercise structure 26 may be implemented in various forms depending on a body part for which the user is to exercise. The form of the exercise structure 26 is widely known and thus will not be described in detail.

The weight exercise apparatus 1 according to an embodiment may further include a component to measure the user's exercise state and feed a result back in the exercise main body 2. For example, the weight exercise apparatus 1 may include a sensor module 100, a UI unit 3 outputting a UI screen, a memory 5 storing at least one instruction, and a processor 4 controlling the UI unit 3.

The UI unit 3 may include an input unit for receiving an input to operate the exercise equipment, an input to set the exercise apparatus, etc., from the user and an output unit for displaying information such as an exercise state, an exercise result, etc. For example, the UI unit 3 may have, but not limited to, a form of a touch screen.

The processor 4 may manage information for managing various functions provided by the weight exercise apparatus 1 or the user's exercise state, by executing at least one instruction stored in the memory 5. The exercise state of the user may include the number of times or a duration the user exercises, an exercise level, an exercise speed, a trajectory of a body of the user, etc. The processor 4 may include at least one processing modules. For example, the processor 4 may include at least one of a central processing unit (CPU), a microprocessor, a graphical processing unit (GPU), application specific integrated circuits (ASICs), a digital signal processor (DSP), and field programmable gate arrays (FPGAs).

The processor 4 may control the other components included in the weight exercise apparatus 1 to perform a function corresponding to a user input received through the UI unit 3. The processor 4 may execute instructions, a software module, or a program stored in the memory 5, read data or a file stored in the memory 5, or store a new program or application in the memory 5.

The memory 5 may store at least one instructions. The processor 4 may correspond to an example of a computer capable of executing instructions stored in the memory 5.

The memory 5 may store instructions, a software module, or a program. The memory 5 may include at least one of a random access memory (RAM), a static random access memory (SRAM), a read-only memory (ROM), a flash memory, an electrically erasable programmable read-only memory (EEPROM), a programmable read-only memory (PROM), a magnetic memory, a magnetic disk, and an optical disk.

The memory 5 may store a UI module and an exercise management module therein. The UI module and the exercise management module may be software modules or programs including at least one instructions and may correspond to a part of another program. The processor 4 may load the UI module and the exercise management module from the memory 5 and execute corresponding instructions.

The UI module may include an UI input/output module and an UI configuration module. The UI input/output module may identify a user's input with respect to a UI screen displayed on the UI unit 3, and control an output of a UI element generated or changed in the UI configuration module. The UI configuration module may generate or change a UI element to be displayed on the UI unit 3 based on information identified by the exercise management module, the UI unit 3, the sensor module 110, etc.

The exercise management module may include an exercise process setting module and an exercise state identification module. The exercise process setting module may set an exercise process suitable for the user based on information about the user when the user who is to use the weight exercise apparatus 1 is identified. For example, the exercise process setting module may receive exercise process information from a smart gym server 200 through a communication interface unit 6 and set an exercise process corresponding to the identified user. The exercise state identification module may generate the user's exercise state information and generate information indicating a progress of the exercise process reflecting the user's exercise state or information indicating the exercise result, based on movement of the exercise equipment, received through the sensor module 100. The sensor module 100 of the exercise state identification module may deliver the generated information to the UI module or record the generated information in the memory 5.

The communication interface unit 6 may perform wired/wireless communication with another device or a network. To this end, the communication interface unit 6 may include a communication module supporting at least one of various wired/wireless communication methods. For example, communication modules that perform short-range communications such as Wireless Fidelity (Wi-Fi), various types of mobile communications such as 3rd-Generation (3G), 4th-Generation (4G), 5th-Generation (5G), etc., or ultra-wideband communications, or communications modules that perform wired communications using coaxial cables, optical cables, etc., may be included, and without being limited thereto, various types of communication modules according to the development of communication technology may be included. The communication interface unit 6 may be connected to a device located outside the weight exercise apparatus 1 to transmit and receive a message including a signal or data. The weight exercise apparatus 1 may communicate with the smart gym server 200, a user terminal in a form such as a wearable device, a smart phone, etc., or a manager terminal 300 (see FIG. 19) in a form such as a personal computer (PC), a laptop computer, a smart phone, etc., through the communication interface unit 6.

Figure 4:
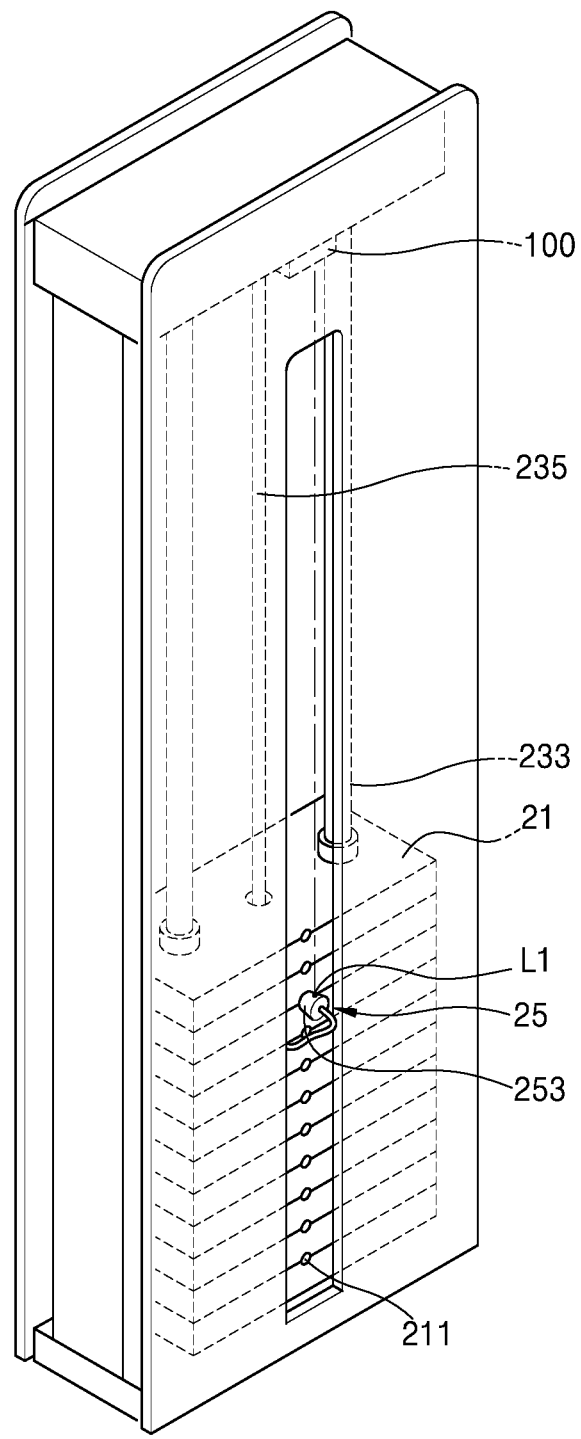
FIG. 4 is a view for describing an example of a sensor module of a weight exercise apparatus according to an embodiment.
Figure 5:
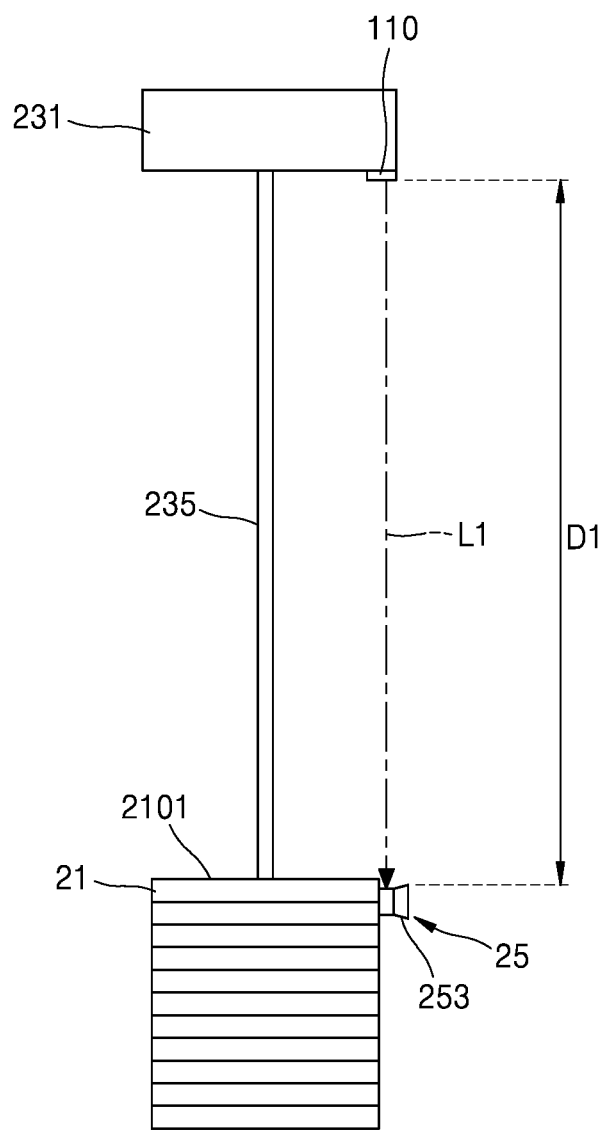
FIG. 5 is a view for describing an operation of a first laser sensor of a sensor module of a weight exercise apparatus according to an embodiment.

FIG. 4 is a view for describing an example of the sensor module 100 of the weight exercise apparatus 1 according to an embodiment. FIG. 5 is a view for describing an operation of a first laser sensor 110 of the sensor module 100 of the weight exercise apparatus 1 according to an embodiment.

Referring to FIGS. 3 to 5, the sensor module 100 may be configured to detect movement of a measurement target, e.g., the weight plate 21. For example, the sensor module 100 may include the first laser sensor 110 configured to detect a moving distance of the weight plate 21 when the weight plate 21 moves. The first laser sensor 110 may irradiate a first laser beam L1 toward the weight plate 21 or a component moving together with the weight plate 21. For example, the first laser sensor 110 may irradiate the first laser beam L1 to the pin structure 25 and receive the first laser beam L1 reflected from the pin structure 25 to detect a position of the pin structure 25. The position of the weight plate 21 may be detected from the position of the pin structure 25.

Figure 6:
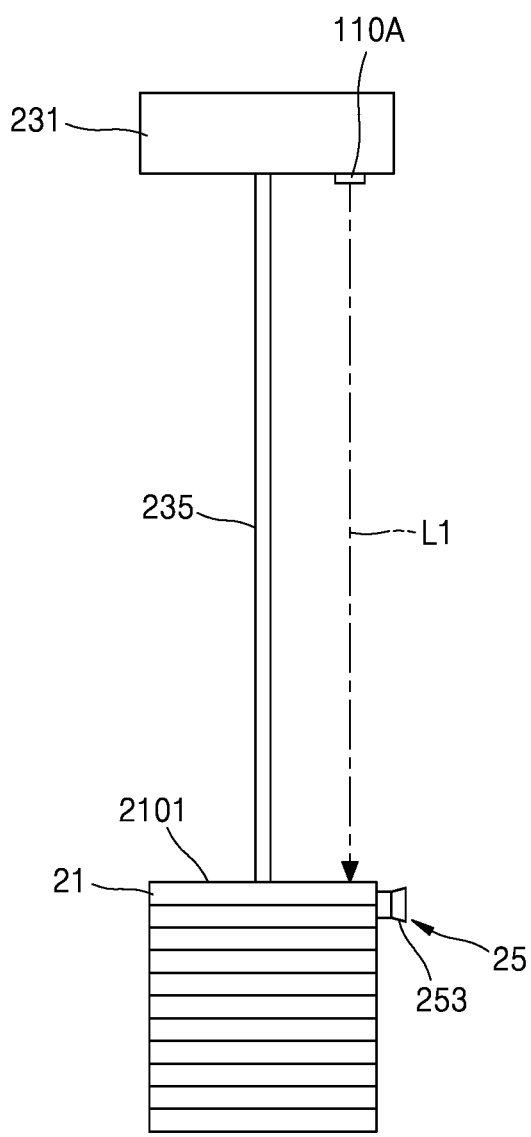
FIG. 6 is a view for describing an example of a sensor module of a weight exercise apparatus according to an embodiment.

However, arrangement and configuration of the first laser sensor 110 may not be limited thereto, and may be changed variously as long as they allow movement of the weight plate 21 to be detected directly or indirectly. For example, as shown in FIG. 6, the first laser sensor 110A may be arranged to irradiate the first laser beam L1 to a top surface of the weight plate 21. In another example, although not shown, for detection of the position of the weight plate 21, the first laser sensor 110 may be arranged to detect movement of a connection line 235 (see FIG. 1) or an angle of a pulley (not shown) that changes a direction of the connection line 235.

The sensor module 100 may sense movement of the weight plate 21 or a manipulation unit that a user's body contacts based on a result of detection by the first laser sensor 110, and obtain sensing data corresponding to the sensed movement. The sensing data may have a form of a time, a distance, a depth, an image, etc.

Figure 7:
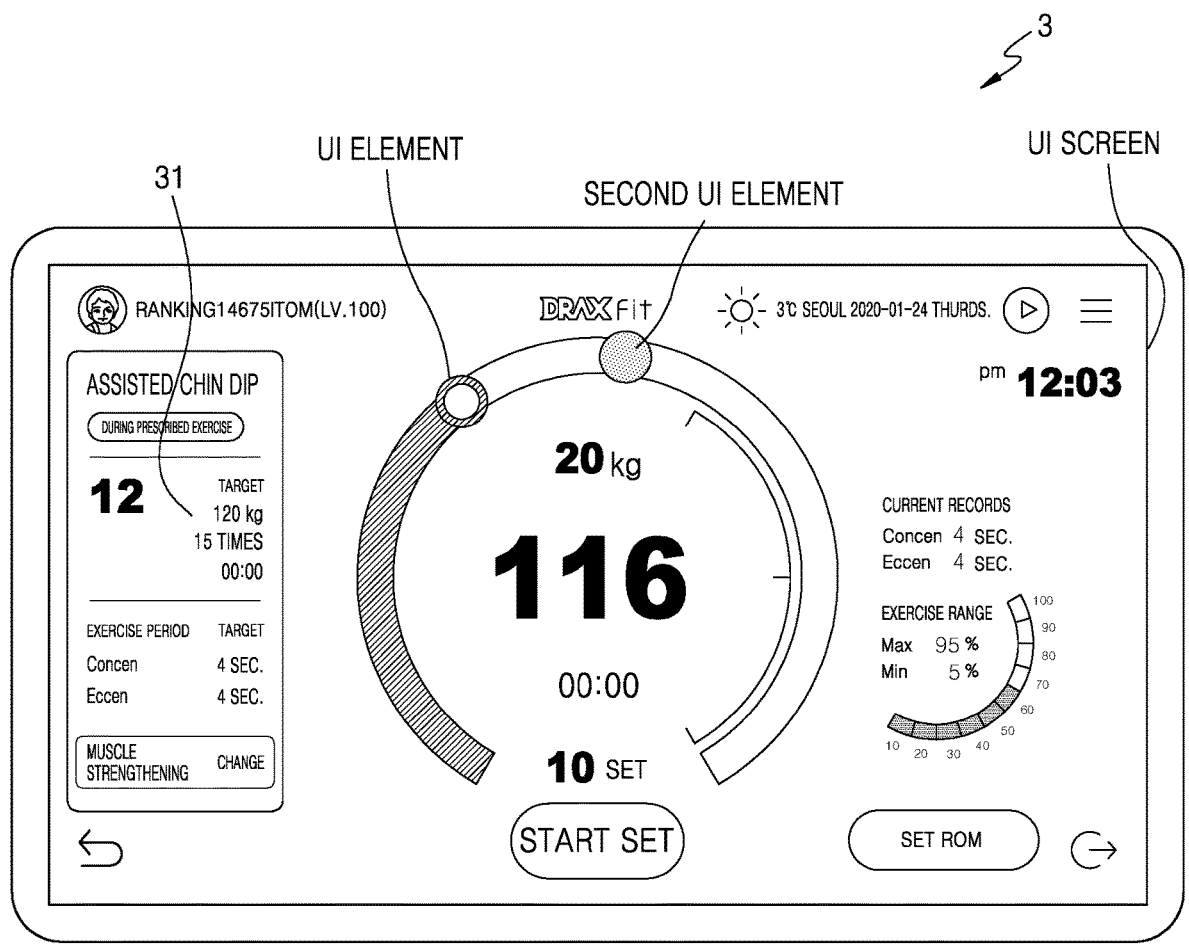
FIG. 7 shows a user interface (UI) screen output on a UI unit of a weight exercise apparatus according to an embodiment.

FIG. 7 shows a UI screen output on the UI unit 3 of the weight exercise apparatus 1 according to an embodiment.

Referring to FIGS. 3 and 7, based on the foregoing configuration, the processor 4 may control the UI unit 3 to display a UI element indicating a user's exercise state corresponding to movement of the weight exercise apparatus 1 detected by the sensor module 100 on the UI screen, by executing at least one instruction stored in the memory 5. The processor 4 may control the UI unit 3 to display a second UI element indicating an exercise guide recommended in an exercise using the weight exercise apparatus 1, together with the UI element, on the UI screen.

As such, the user of the weight exercise apparatus 1 may recognize the user's exercise state by using data (or information) displayed on the UI screen. In this way, the user may exercise efficiently.

The sensor module 100 may further include a function of detecting weight setting of the exercise main body 2. The processor 4 may control the UI unit 3 to display information 31 indicating the weight setting of the exercise main body 2 detected by the sensor module 100 on the UI screen.

The weight exercise apparatus 1 according to an embodiment may be exposed to various surrounding environmental conditions. For example, the sensor module 100 of the weight exercise apparatus 1 may be exposed to various surrounding environmental conditions. For example, the surrounding environmental conditions of the sensor module 100 of the weight exercise apparatus 1 may vary depending on season, weather, and indoor environment. In another example, the surrounding environmental conditions of the sensor module 100 of the weight exercise apparatus 1 may change with a state of a peripheral part, e.g., a printed circuit board (PCB).

In the weight exercise apparatus 1, the first laser sensor 110 of the sensor module 100 may have a measurement error depending on a change of the surrounding environmental conditions. The surrounding environmental conditions may include at least one of ambient temperature and ambient humidity. The surrounding environmental conditions may include a state of an electronic part of the weight exercise apparatus 1, e.g., a PCB. For example, when at least one of the ambient temperature, ambient humidity, and the electronic part of the weight exercise apparatus 1 changes, a first detected distance D1 detected by the first laser sensor 110 may change. For example, the first detected distance D1 of the first laser sensor 110 with respect to the weight plate 21 located at the same distance may be different when the ambient temperature changes. As such, the first laser sensor 110 may have a measurement error according to a change in the surrounding environmental conditions.

Such a measurement error may result in degradation of reliability of information detected by the sensor module 100. This may lead to incorrect feedback on the exercise state of the user.

In a way to compensate for the measurement error, an influence of the surrounding environmental conditions may be removed from a value detected by the first laser sensor 110.

However, the first laser sensor 110 is a sensor for detecting the moving weight plate 21, such that the first detected distance D1 may change in real time with movement of the weight plate 21. The amount of change of the first detected distance D1 detected by the first laser sensor 110 includes the amount of change with movement of the weight plate 21 as well as the amount of change occurring according to the change in the surrounding environmental conditions, making it difficult to identify the amount of change occurring according to the change in the surrounding environmental conditions from the amount of change of the first detected distance D1 detected by the first laser sensor 110.

Figure 8:
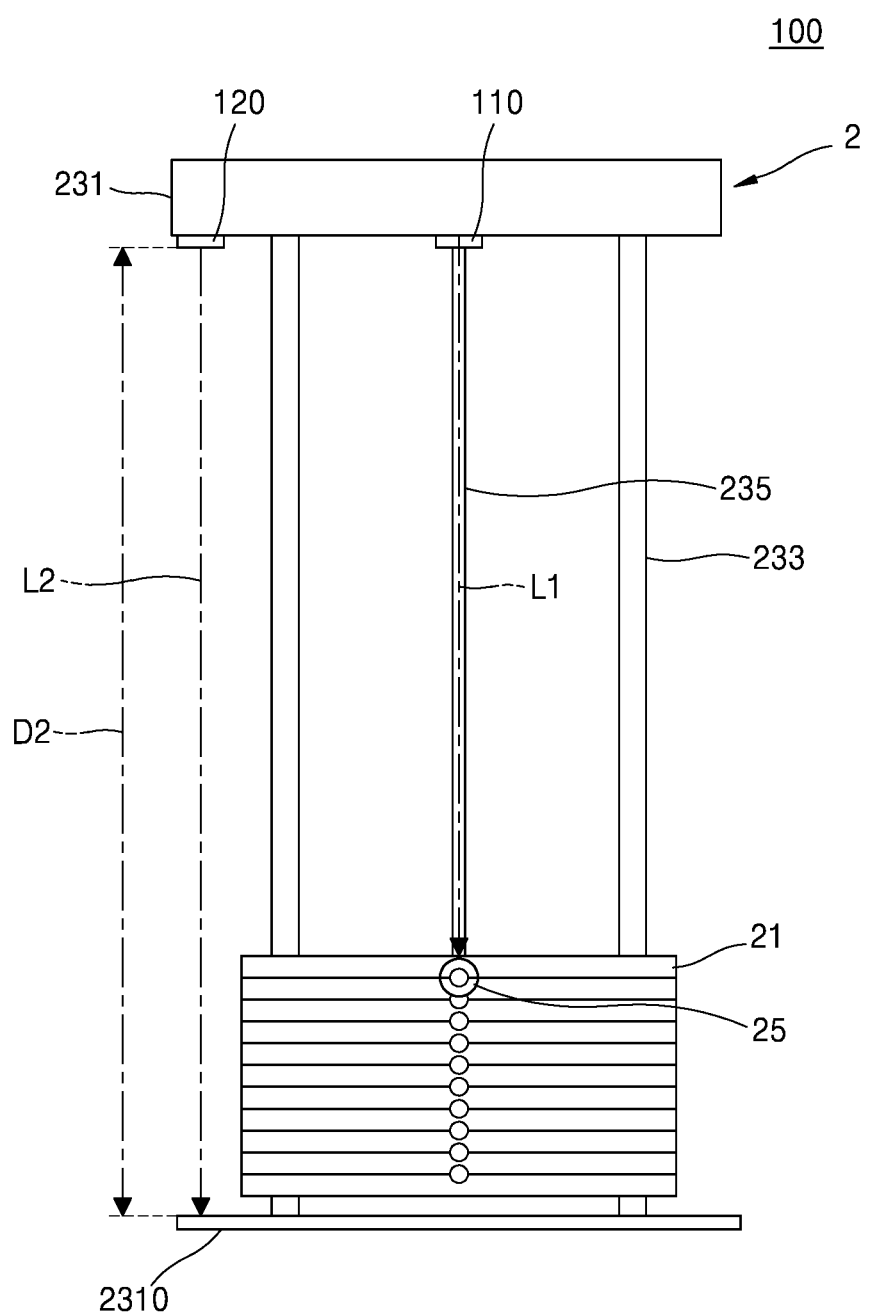
FIG. 8 conceptually shows an example of a sensor module according to an embodiment.
Figure 9:
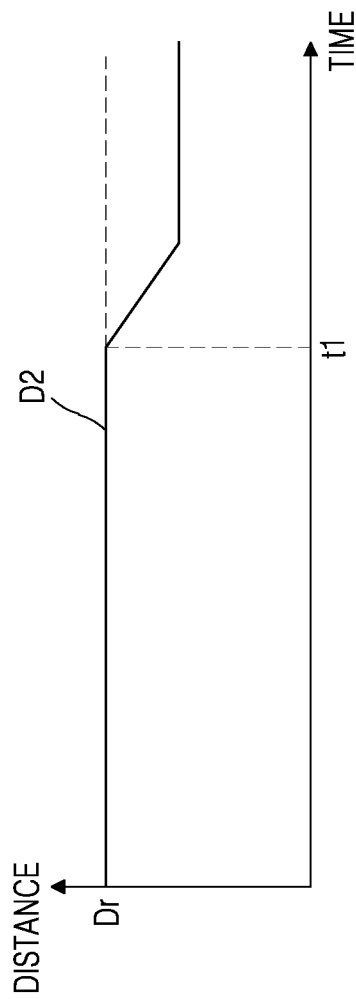
FIG. 9 is a graph showing a change of a second detected distance detected by a second laser sensor according to an embodiment.

FIG. 8 conceptually shows an example of the sensor module 100 according to an embodiment. FIG. 9 is a graph showing a change of a second detected distance D2 detected by the second laser sensor 100 according to an embodiment.

Referring to FIG. 8, the sensor module 100 according to an embodiment may further include a second laser sensor 120 exposed to the same surrounding environmental conditions as the first laser sensor 110. In this way, the sensor module 100 may compensate for a measurement error of the first laser sensor 110 without designing complex software.

The second laser sensor 120 may irradiate a second laser beam L2 toward a component that does not move regardless of movement of the weight plate 21 when the weight plate 21 moves. As an example for this end, the second laser sensor 120 may irradiate the second laser beam L2 toward a region that is installed on the exercise main body 2 and does not move on the exercise main body 2. For example, the second laser sensor 120 may be arranged to irradiate the second laser beam L2 toward a fixed region 2310 in the frame structure 23 supporting the plurality of weight plates 21 to allow the plurality of weight plates 21 to move. In another example, although not shown, the second laser sensor 120 may be arranged to irradiate the second laser beam L2 to a fixed region outside the weight exercise apparatus 1.

As such, the second laser sensor 120 may irradiate the second laser beam L2 toward the fixed region 2310 that does not move. The second laser sensor 120 may be arranged to measure a preset reference distance Dr.

The second laser sensor 120 measures the reference distance Dr, such that the second detected distance D2 detected by the second laser sensor 120 may be uniform when the surrounding environment conditions are constant. The second detected distance D2 detected constant may be the reference distance Dr. In another example, the reference distance Dr may be a predetermined distance.

As the surrounding environmental conditions change, the second detected distance D2 detected by the second laser sensor 120 may become different from the reference distance Dr. From a distance between the reference distance Dr and the second detected distance D2, the amount of change occurring according to the surrounding environmental conditions may be estimated. Moreover, a time t1 at which a change in the surrounding environmental conditions starts may be estimated.

The first laser sensor 110 and the second laser sensor 120 may have the same specifications. For example, the first laser sensor 110 and the second laser sensor 120 may have the same measurement accuracy. Thus, the measurement error of the first laser sensor 110 occurring according to the change in the surrounding environmental conditions may correspond to the measurement error of the second laser sensor 120 occurring according to the change in the surrounding environmental conditions.

For example, by calculating the amount of change of the second detected distance D2 of the second laser sensor 120, a compensation factor may be determined. Thus, by reflecting the determined compensation factor in the first detected distance D1 of the first laser sensor 110, the position of the weight plate 21 may be determined.

In an example, a change rate of the second detected distance D2 of the second laser sensor 120 may correspond to a change rate of the first detected distance D1 of the first laser sensor 110. For example, the change rate of the second detected distance D2 of the second laser sensor 120 may be the same as the change rate of the first detected distance D1 of the first laser sensor 110. Based on the change rate of the second detected distance D2, the measurement error of the first detected distance occurring according to the change in the surrounding environmental conditions may be compensated for.

For example, the position of the weight plate 21 may be determined by considering the change rate of the second detected distance D2 in the first detected distance D1. For example, the compensation factor may be determined by calculating the change rate of the second detected distance D2, and the position of the weight plate 21 may be determined by reflecting the determined compensation factor in the first detected distance D1.

For example, as the ambient temperature of the weight exercise apparatus 1 changes by 5 degrees (° C.), the second detected distance D2 detected by the second laser sensor 120 may change from about 500 mm to about 450 mm. In this case, the change rate of the second detected distance D2 may be calculated as about −10%. The compensation factor for compensating for the measurement error may be determined as about 10/9 (=100%/(100%−10%)). In this case, when the first detected distance D1 detected by the first laser sensor 110 is about 900 mm, the position of the weight plate 21 may be determined as about 1000 mm (=900 mm×10/9) by multiplying the first detected distance D1 by the compensation factor.

In another example, the amount of change of the second detected distance D2 of the second laser sensor 120 may correspond to the amount of change of the first detected distance D1 of the first laser sensor 110. For example, the amount of change of the second detected distance D2 of the second laser sensor 120 may be the same as the amount of change of the first detected distance D1 of the first laser sensor 110. Based on the amount of change of the second detected distance D2, the measurement error of the first detected distance occurring according to the change in the surrounding environmental conditions may be compensated for.

For example, the position of the weight plate 21 may be determined by considering the amount of change of the second detected distance D2 in the first detected distance D1. For example, the compensation factor may be determined by calculating the amount of change of the second detected distance D2, and the position of the weight plate 21 may be determined by reflecting the determined compensation factor in the first detected distance D1.

For example, as the ambient temperature of the weight exercise apparatus 1 changes by 5 degrees (° C.), the second detected distance D2 detected by the second laser sensor 120 may change from about 500 mm to about 450 mm. In this case, the amount of change of the second detected distance D2 may be calculated as about −50 mm. The compensation factor for compensating for the measurement error may be determined as about +50 mm or a value obtained by multiplying about +50 mm by a decimal or an integer. For example, the compensation factor may be determined as about +50 mm. In this case, when the first detected distance D1 detected by the first laser sensor 110 is about 900 mm, the position of the weight plate 21 may be determined as about 950 mm (=900 mm+50 mm) by adding the compensation factor to the first detected distance D1.

Figure 10:
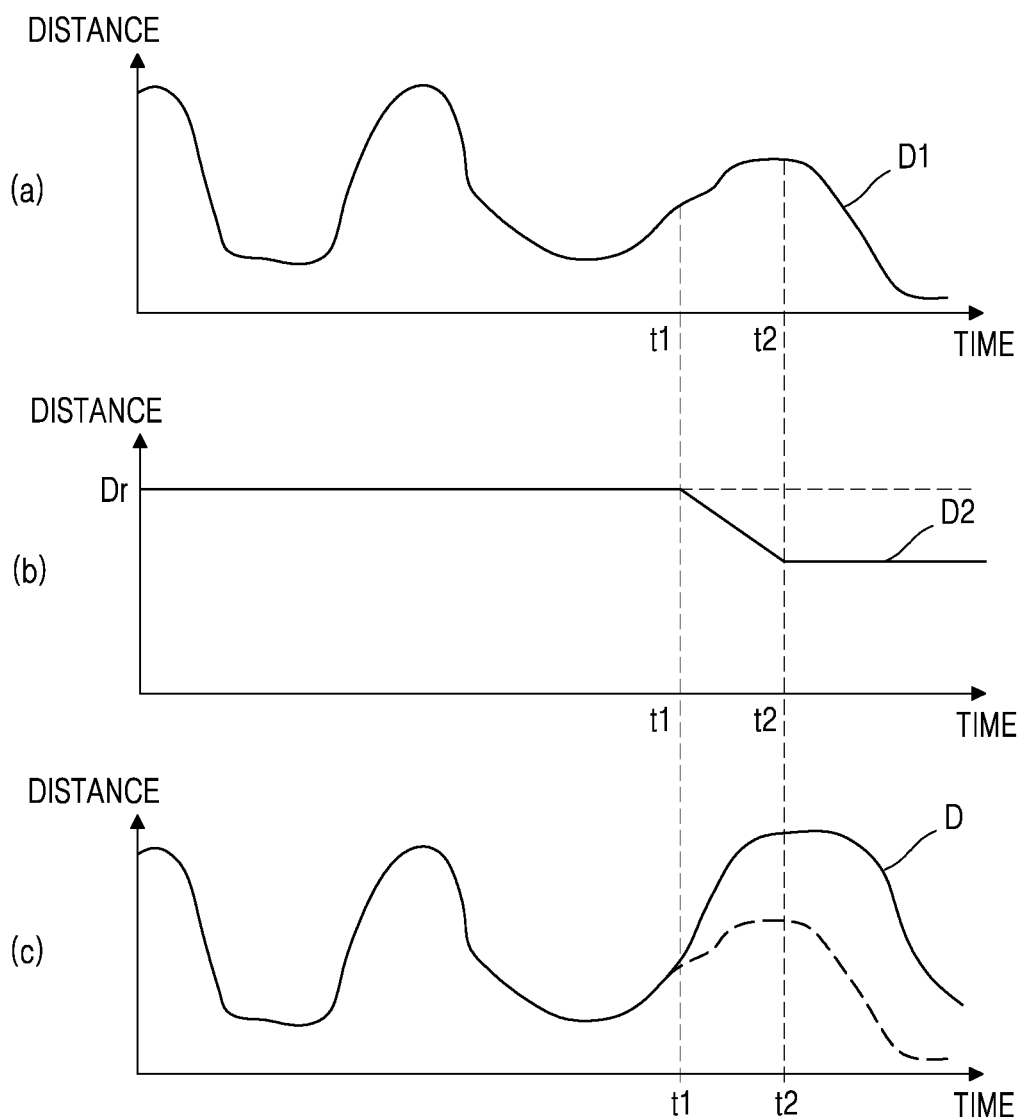
FIG. 10 is a view for describing a result of compensating for a measurement error of a first detected distance in a sensor module according to an embodiment.

FIG. 10 is a view for describing a result of compensating for a measurement error of the first detected distance D1 in the sensor module 100 according to an embodiment. (a) of FIG. 10 shows the first detected distance D1 detected by the first laser sensor 110, (b) of FIG. 10 shows the second detected distance D2 detected by the second laser sensor 120, and (c) of FIG. 10 shows a position D of the weight plate 21 determined by compensating for the measurement error in the first detected distance D1.

Referring to FIG. 10, a surrounding environmental condition, e.g., the temperature may change from a first time t1 to a second time t2, and after the second time t2, the changed temperature may be maintained. In this case, referring to (a) of FIG. 10, the first detected distance D1 detected by the first laser sensor 110 changes at the first time t1, but there is no way to identify whether the change of the first detected distance D1 results from a change of an exercise pattern of the user or a change in the surrounding environmental conditions. On the other hand, referring to (b) of FIG. 10, the second laser sensor 120 is arranged to detect the specific reference distance Dr, such that the processor may determine from the change of the second detected distance D2 at the first time t1 that the change of the first detected distance results from the change in the surrounding environmental conditions.

Thus, the processor may calculate the amount of change of the second detected distance D2 and determine the compensation factor based on the calculated amount of change. By reflecting the compensation factor to the first detected distance D1, the position D of the weight plate 21 may be compensated for as shown in (c) of FIG. 10. As the surrounding environmental conditions change, the compensation factor may change from the first time t1 to the second time t2, and as the surrounding environmental conditions maintain a new state, the compensation coefficient may be constant from the second time t2.

Meanwhile, in the above-described embodiment, a description has been made mainly of an example where the sensor module 100 includes the plurality of laser sensors 110 and 120. However, a sensor module of a weight exercise apparatus according to an embodiment is not limited thereto, and may also be implemented with a single laser sensor.

Figure 11:
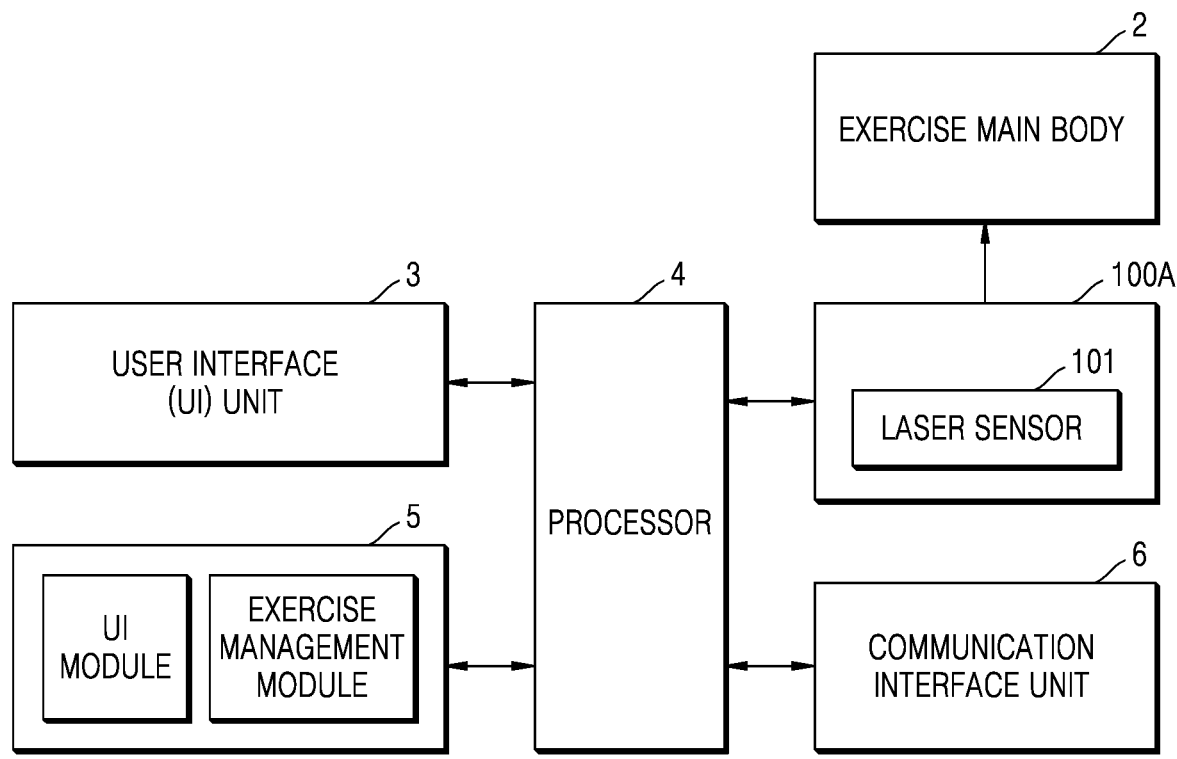
FIG. 11 is a block diagram of a weight exercise apparatus according to another embodiment.

FIG. 11 is a block diagram of a weight exercise apparatus according to another embodiment.

Referring to FIG. 11, a weight exercise apparatus according to an embodiment may include the exercise main body 2, a sensor module 100A, the UI unit 3, the memory 5, and the processor 4. In the current embodiment, a description will be made mainly of a difference from the above-described embodiments and a description of the same matter will be omitted.

The sensor module 100A according to an embodiment may include a single laser sensor 101. The laser sensor 101 may include a first sensing mode and a second sensing mode.

In the first sensing mode, the laser sensor 101 may irradiate a laser beam L to detect a moving distance of the weight plate 21 when the weight plate 21 moves. For example, in the first sensing mode, the laser sensor 101 may irradiate the laser beam L toward the weight plate 21 or a component moving together with the weight plate 21.

In the second sensing mode, the laser sensor 101 may irradiate the laser beam L toward a component that does not move regardless of movement of the weight plate 21 when the weight plate 21 moves. For example, in the second sensing mode, the laser sensor 101 may irradiate the laser beam L toward a member or a region having a fixed position, regardless of movement of the weight plate 21.

Figure 12:
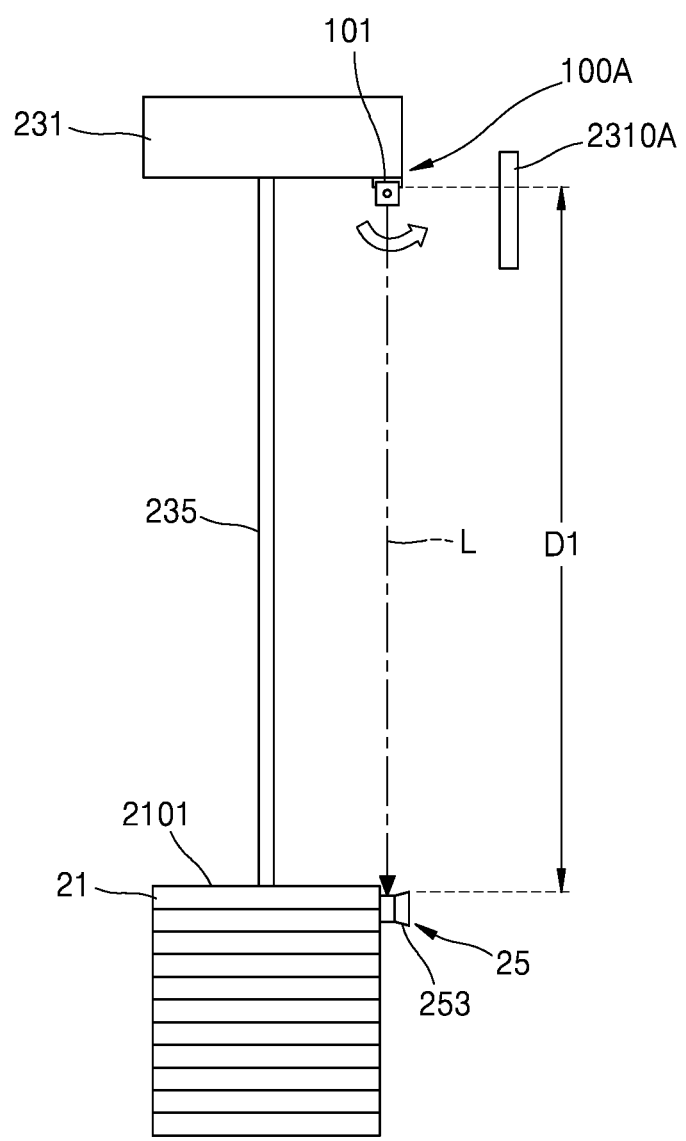
FIGS. 12 and 13 are views for describing an example of a sensor module including a single laser sensor.
Figure 13:
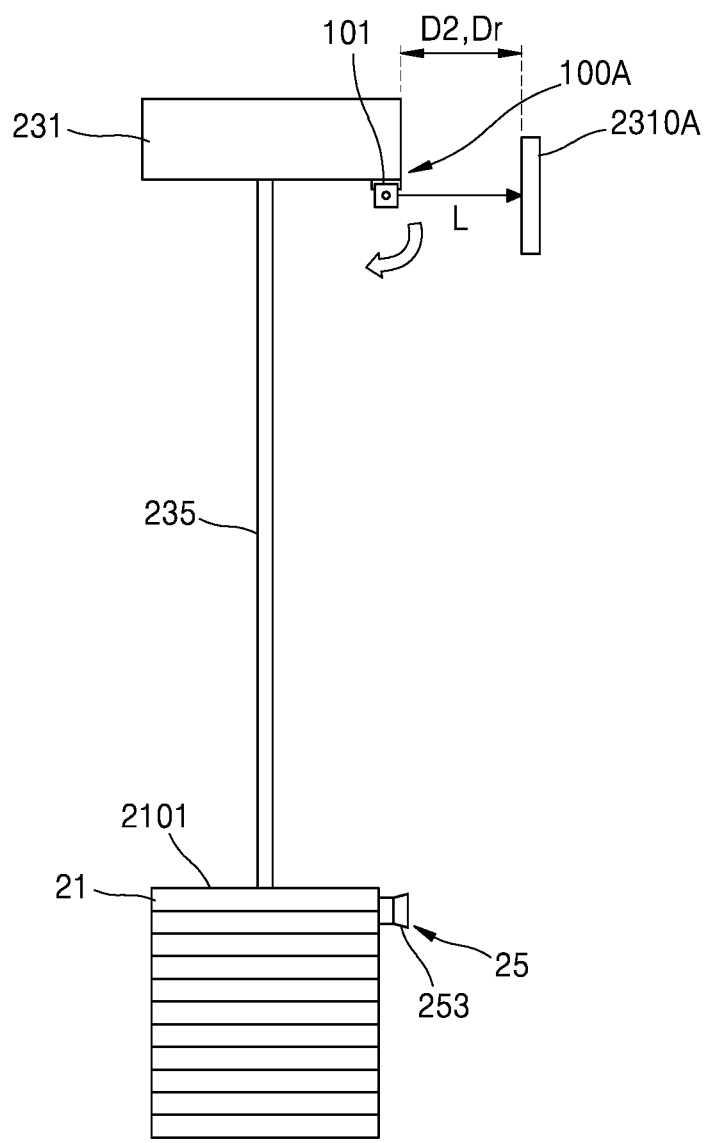

FIGS. 12 and 13 are views for describing an example of the sensor module 100A including the single laser sensor 101.

Referring to FIGS. 12 and 13, on the sensor module 100A according to an embodiment, the laser sensor 101 may be rotatable. As the laser sensor 101 rotates, an irradiation direction of the laser beam L may change.

In the laser sensor 101, a direction in which the laser beam L is irradiated in the first sensing mode may be different from a direction in which the laser beam L is irradiated in the second sensing mode.

Referring to FIG. 12, the laser sensor 101 may be arranged to irradiate the laser beam L toward the pin structure 25 in the first sensing mode. The laser sensor 101 may receive the laser beam L reflected from the pin structure 25 and detect the position of the pin structure 25. The position of the weight plate 21 may be detected from the position of the pin structure 25.

However, arrangement of the laser sensor 101 is not limited thereto, such that the arrangement may be changed variously as long as it is intended to irradiate the laser beam L toward the weight plate 21 or a component moving together with the weight plate 21.

The sensor module 100A may sense movement of the weight plate 21 or a manipulation unit that a user's body contacts based on a result of detection by the laser sensor 101 in the first sensing mode, and obtain sensing data corresponding to the sensed movement. The sensing data may have a form of a time, a distance, a depth, an image, etc.

By executing at least one instructions stored in the memory 5, the UI unit 3 may be controlled to display a UI element indicating the user's exercise state corresponding to movement of the weight exercise apparatus 1 detected by the sensor module 100A to be displayed on the UI screen.

Referring to FIGS. 12 and 13, the laser sensor 101 may move to switch from the first sensing mode to the second sensing mode. For example, the laser sensor 101 may rotate to switch from the first sensing mode to the second sensing mode. To switch from the first sensing mode to the second sensing mode, the laser sensor 101 may rotate in a counterclockwise direction. On the other hand, to switch from the second sensing mode to the first sensing mode, the laser sensor 101 may rotate in a clockwise direction. A position to which the laser beam L is irradiated when the laser sensor 101 is in the first sensing mode may be different from a position to which the laser beam L is irradiated when the laser sensor 101 is in the second sensing mode. For example, a direction in which the laser beam L is irradiated when the laser sensor 101 is in the first sensing mode may be different from a direction in which the laser beam L is irradiated when the laser sensor 101 is in the second sensing mode.

The processor 4 may periodically rotate the laser sensor 101 such that the laser sensor 101 periodically switches to the first sensing mode and the second sensing mode.

When the laser sensor 101 is in the second sensing mode, the laser beam L may be irradiated toward the frame structure 23 or a fixed region 2310A in a peripheral member thereof. The fixed region 2310A may be a member with a fixed position regardless of movement of the weight plate 21 when the weight plate 21 moves.

The position of the fixed region 2310A is fixed, and the position of the laser sensor 101 has a constant position in the second sensing mode thereof, such that a space between the fixed region 2310A and the laser sensor 101 in the second sensing mode may be constant. When the laser sensor 101 is in the second sensing mode, the preset reference distance Dr may be measured.

Thus, the amount of change occurring due to the surrounding environment conditions may be estimated from a difference between the second detected distance D2 detected in the second sensing mode of the laser sensor 101 and the reference distance Dr.

The processor 4 may determine the compensation factor by calculating the amount of change of the second detected distance D2 of the laser sensor 101 in the second sensing mode. Thus, by reflecting the determined compensation factor in the first detected distance D1 of the laser sensor 101 in the first sensing mode, the position of the weight plate 21 may be determined.

However, a component for implementing a plurality of sensing modes through the single laser sensor 101 in the sensor module 100A is not limited thereto, and may be various. While rotation is described as an example of movement of the laser sensor 101 in the above-described embodiments, movement of the laser sensor 101 is not limited thereto. For example, although not shown, the laser sensor 101 may move in a horizontal direction. In this case, the laser sensor 101 may have a position overlapping the pin structure 25 in the first sensing mode and a position not overlapping the pin structure 25 in the second sensing mode.

Figure 14:
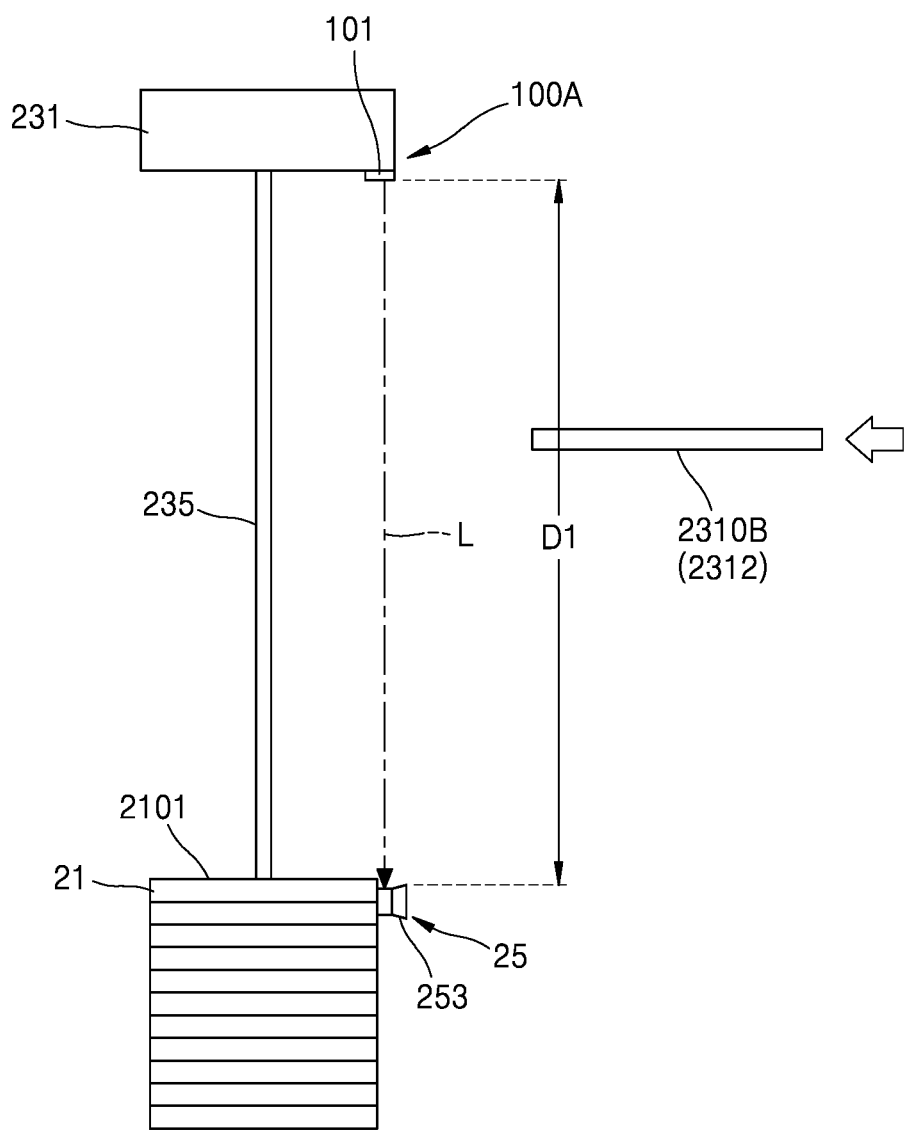
FIGS. 14 and 15 are views for describing another example of a sensor module including a single laser sensor.
Figure 15:
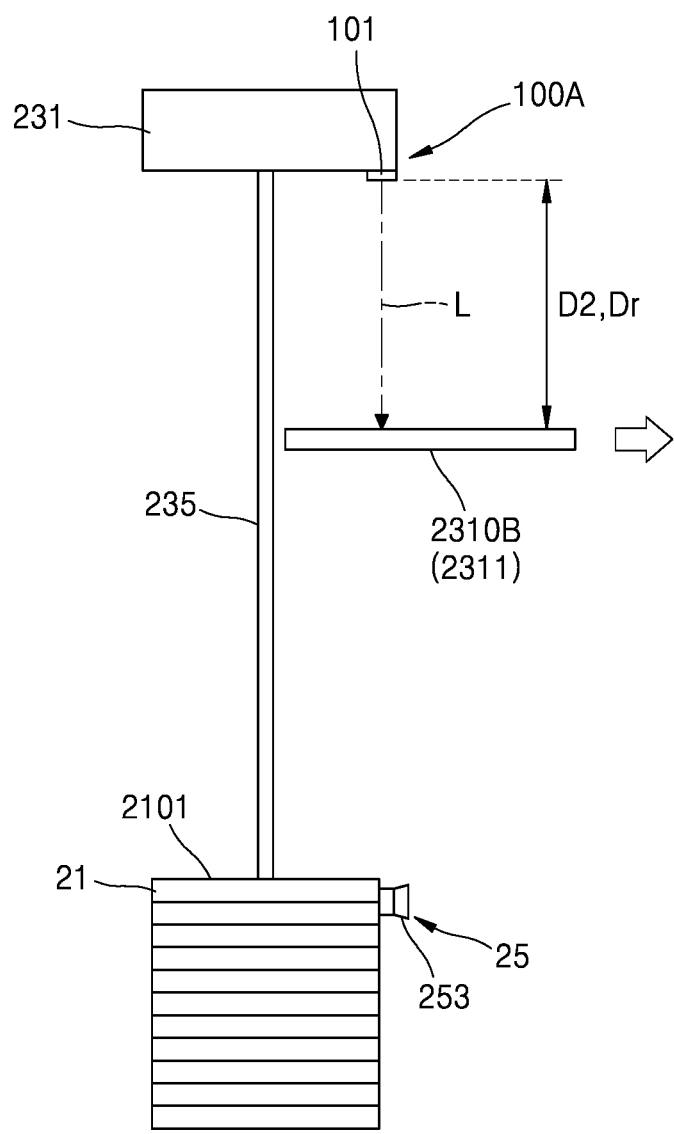

FIGS. 14 and 15 are views for describing another example of the sensor module 100A including the single laser sensor 101. Referring to FIGS. 14 and 15, in the sensor module 100A according to an embodiment, the laser sensor 101 is fixed without rotating and an absolute position of a fixed region may not be fixed on every axis.

For example, the laser sensor 101 may irradiate the laser beam L toward the weight plate 21 or a component moving together with the weight plate 21. For example, the laser sensor 101 may be arranged to irradiate the laser beam L toward the pin structure 25.

The sensor module 100A may further include a reference plate 2310B movable with respect to the laser sensor 101. The reference plate 2310B may move between an interference position 2311 interfering with an irradiation path of the laser beam L and a deviation position 2312 deviating from the irradiation path of the laser beam L. For example, the reference plate 2310B may move in a direction perpendicular to the irradiation direction of the laser beam L of the laser sensor 101.

When the reference plate 2310B is at the deviation position 2312, the laser sensor 101 may be in the first sensing mode. The sensor module 100A may sense movement of a manipulation unit the weight plate 21 or a user's body contacts based on a result of detection by the laser sensor 101 in the first sensing mode, and obtain sensing data corresponding to the sensed movement. The sensing data may have a form of a time, a distance, a depth, an image, etc.

When the reference plate 2310B is at the interference position 2311, the laser sensor 101 may be in the second sensing mode. When the reference plate 2310B is at the interference position 2311, a distance between the reference plate 2310B and the laser sensor 101 may be constant. For example, a space between the reference plate 2310B at the interference position 2311 and the laser sensor 101 may be constant. When the laser sensor 101 is in the second sensing mode, the preset reference distance Dr may be measured.

Thus, the amount of change occurring due to the surrounding environment conditions may be estimated from a difference between the second detected distance D2 detected in the second sensing mode of the laser sensor 101 and the reference distance Dr.

The processor 4 may determine the compensation factor by calculating the amount of change of the second detected distance D2 of the laser sensor 101 in the second sensing mode. Thus, by reflecting the determined compensation factor in the first detected distance D1 of the laser sensor 101 in the first sensing mode, the position of the weight plate 21 may be determined.

Figure 16:
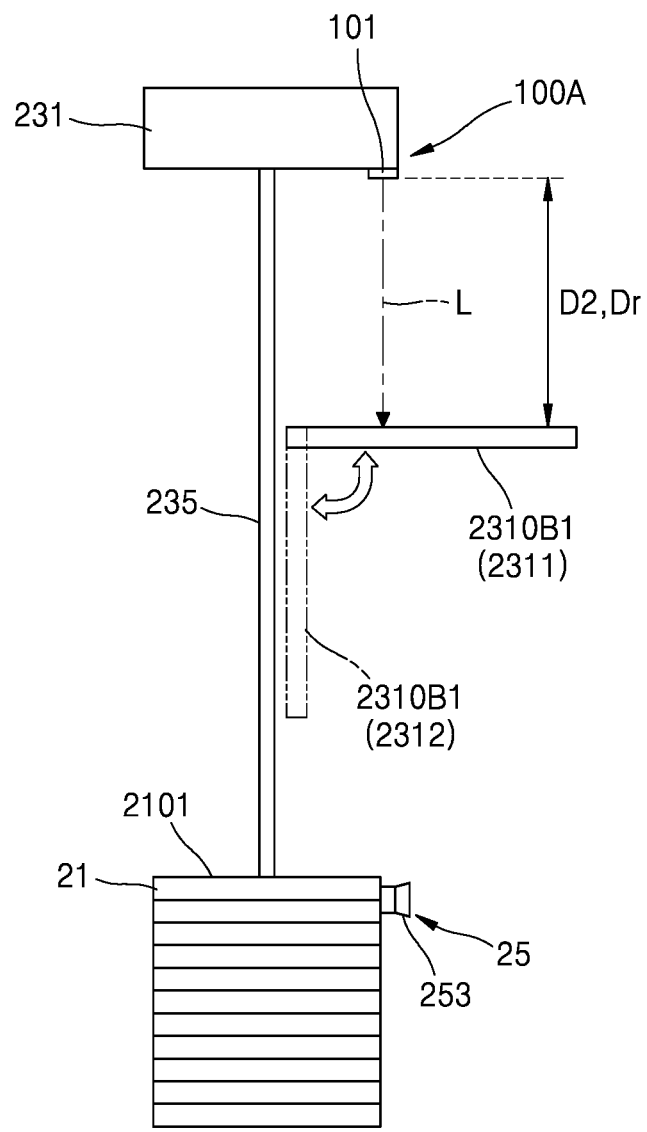
FIG. 16 is a view for describing another example of a sensor module including a single laser sensor.

In the above-described embodiment, a description has been made of an example where the reference plate 2310B has a structure movable with respect to the laser sensor 101 in the horizontal direction. However, the movable structure of the reference plate 2310B is not limited thereto. For example, as shown in FIG. 16, a reference plate 2310B1 may have a structure tiltable around a predetermined axis. Thus, the reference plate 2310B1 may have the interference position 2311 or the deviation position 2312 according to a tilting angle of the reference plate 2310B1.

Figure 17:
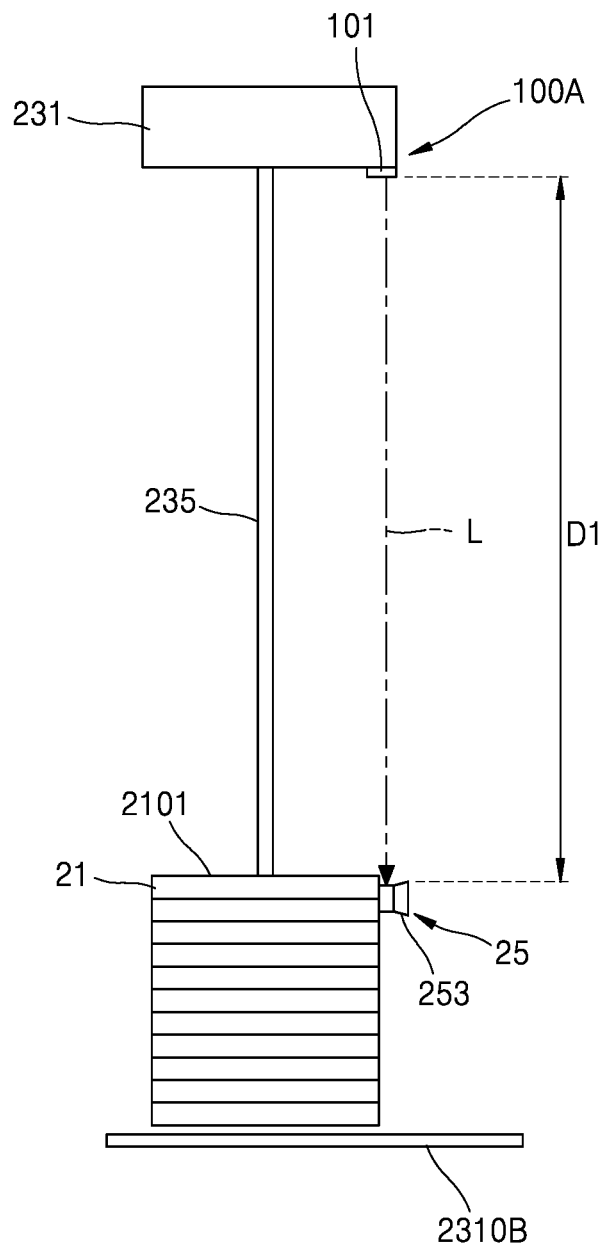
FIGS. 17 and 18 are views for describing an example of a sensor module including a single laser sensor.
Figure 18:
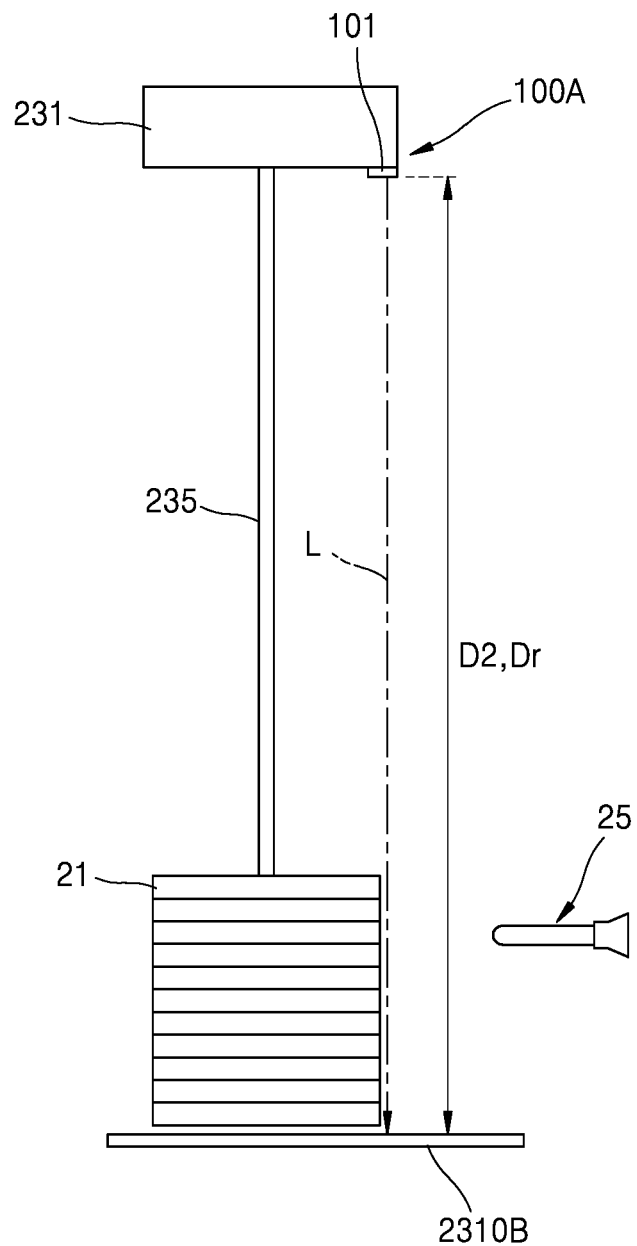

FIGS. 17 and 18 are views for describing an example of the sensor module 100A including the single laser sensor 101. Referring to FIGS. 17 and 18, in the weight exercise apparatus according to an embodiment, the exercise main body may include the frame structure 23 supporting the plurality of weight plates 21 to allow the plurality of weight plates 21 to move. The frame structure 23 may include the fixed region 2310B that does not move when the weight plate 21 moves.

The laser sensor 101 may be arranged to irradiate the laser beam L toward the pin structure 25 for weight setting of the weight exercise apparatus. The laser sensor 101 may irradiate the laser beam L toward the fixed region 2310B of the frame structure 23 when the pin structure 25 is separated from the weight plate 21.

The laser sensor 101 according to an embodiment may have the first sensing mode when irradiating the laser beam L to the pin structure 25 and may have the second sensing mode when irradiating the laser beam L to the fixed region 2310B.

The pin structure 25 may move together when the weight plate 21 moves, whereas the fixed region 2310B may have a position fixed regardless of movement of the weight plate 21. A distance between the fixed region 2310B and the laser sensor 101 may be defined as the reference distance Dr.

The processor 4 may switch the laser sensor 101 from the first sensing mode to the second sensing mode when the distance D2 detected by the laser sensor 101 corresponds to the reference distance Dr. The processor 4 may switch the laser sensor 101 from the second sensing mode to the first sensing mode when the distance D2 detected by the laser sensor 101 does not correspond to the reference distance Dr. Thus, the sensor module 100A according to an embodiment may compensate for an error by using the second sensing mode each time when the user separates the pin structure 25 from the weight plate 21.

Figure 19:
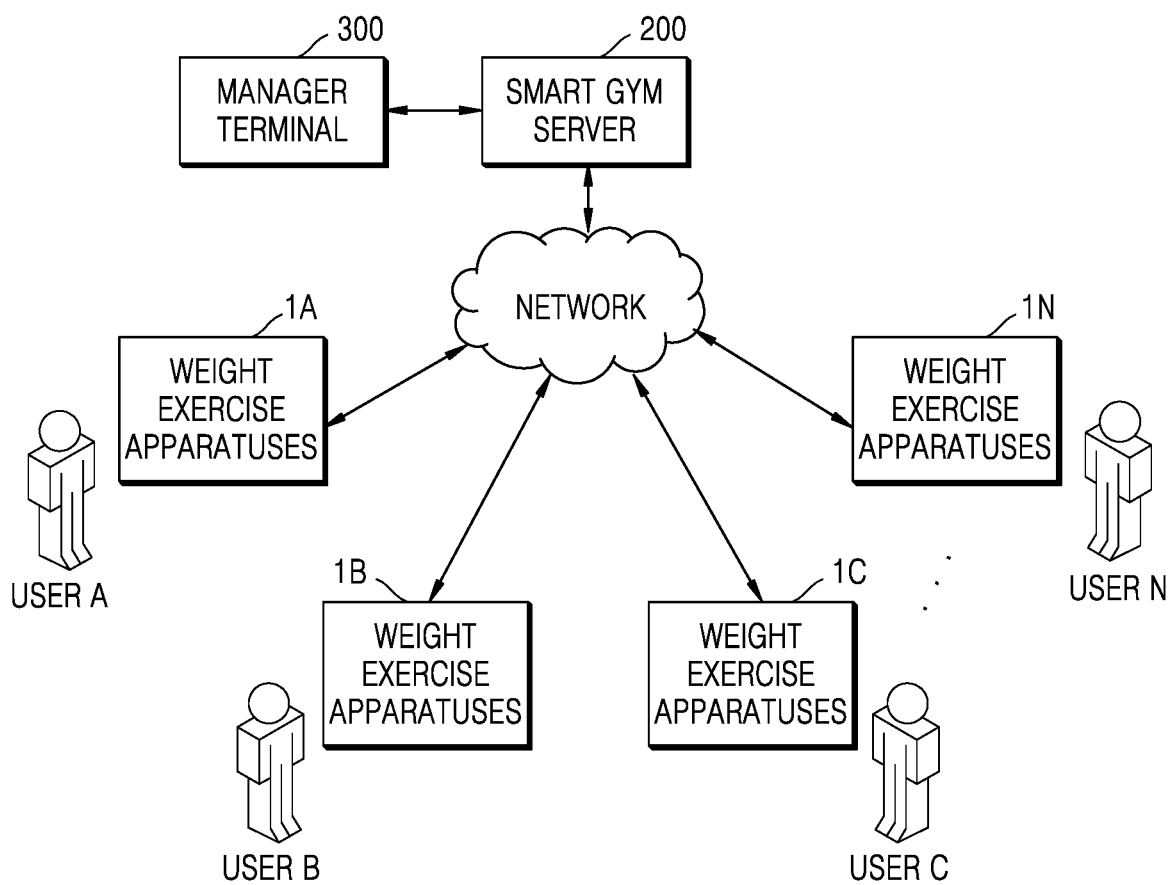
FIG. 19 is a view for describing a smart gym environment provided with a weight exercise apparatus according to an embodiment of the disclosure.

FIG. 19 is a view for describing a smart gym environment provided with the weight exercise apparatus 1 according to an embodiment of the disclosure.

Referring to FIG. 19, a plurality of weight exercise apparatuses 1A, 1B, 1C, and 1N are connected to a smart gym server 200 through a network. A manager such as a health trainer or a smart gym director may access the smart gym server 200 through a manager terminal 300.

Each of users USER A, USER B, USER C, and USER N coming to exercise at a smart gym may enter the smart gym after verifying an identify thereof using a user terminal such as a wearable device, a smart phone, etc., when entering and exiting the smart gym. For example, the user may enter or exit the smart gym after member verification by tagging the user terminal to an unmanned terminal such as a kiosk at the entrance of the smart gym in a near field communication (NFC) or radio frequency identification (RFID) manner. Information about a user whose membership has been verified may be transmitted from the smart gym server 200 to at least one of the weight exercise apparatuses 1A, 1B, 1C, and 1N through the network.

When the user accesses any one of the weight exercise apparatuses 1A, 1B, 1C, and 1N to tag a wearable device to the corresponding weight exercise apparatus 1, then the corresponding weight exercise apparatus 1 may automatically set an exercise program customized to an ability level and an exercise performance history of the user based on information received from the smart gym server 200.

The smart gym server 200 may store user information of a plurality of users, device information of the weight exercise apparatuses 1A, 1B, 1C, and 1N, and information used to operate other facilitates or the smart gym.

When the manager such as a health trainer registers the exercise program customized to the user in the manager terminal 300, exercise process information stored in the smart gym server 200 may be updated. The weight exercise apparatuses 1A, 1B, 1C, and 1N may receive the exercise process information from the smart gym server 200 connected through the network. Meanwhile, in the above-described embodiment, a shoulder press for strengthening a shoulder has been described as an example of the exercise main body 2, but any exercise equipment for weight exercises may be applied variously, without being limited thereto.

In the sensor module 100 according to the above-described embodiment, the weight plate 21 of the weight exercise apparatus 1 has been described as an example of a measurement target. However, an application target of the sensor module 100 according to an embodiment is not limited thereto, and the sensor module 100 may also be applied to other measurement objects than the weight plate 21. That is, the sensor module 100 according to the disclosure is intended to detect movement of a measurement target, and may include the first laser sensor 110 to irradiate the first laser beam L1 toward the measurement target or the component moving together with the measurement target to measure movement of the measurement target when the measurement target moves, and the second laser sensor 120 to irradiate the second laser beam L2 toward a component that does not move regardless of movement of the measurement target when the measurement target moves.

An embodiment of the disclosure may be implemented in the form of a computer program executable on a computer through various components, and the computer program may be recorded on a computer-readable medium. The medium may include a hardware device specially configured to store and execute a program instruction, like a magnetic medium such as a hard disk, a floppy disk, and a magnetic tape, an optical recording medium such as a CD-ROM and a DVD, a magneto-optical medium such as a floptical disk, ROM, RAM, flash memory, etc. Moreover, the medium may include intangible media implemented in a form transmittable on a network, and may be, for example, a medium implemented in the form of software or an application that may be transmitted and distributed through a network.

Meanwhile, the computer program may be a program command specially designed and configured for the disclosure or a program command known to be used by those skilled in the art of the computer software field. Examples of the computer program may include not only a machine language code created by a complier, but also a high-level language code executable by a computer using an interpreter.

With the weight exercise apparatus and the sensor module used therein according to an embodiment of the disclosure, it is possible to perform accurate measurement to efficiently guide a user's weight exercise with a low price-burden.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A weight exercise apparatus comprising:
an exercise main body comprising a plurality of weight plates which are movable;
a sensor module configured to detect movement of a weight plate of the plurality of weight plates;
a user interface unit configured to output a user interface screen;
a memory storing at least one instruction; and
a processor configured to control the user interface unit to display a user interface element indicating an exercise state of a user corresponding to detected movement on the user interface screen, by executing the at least one instruction,
wherein the sensor module comprises:

a first laser sensor configured to irradiate a first laser beam toward the weight plate or a component moving together with the weight plate to detect a first distance of the weight plate when the weight plate moves; and a second laser sensor configured to irradiate a second laser beam toward a component that does not move in spite of movement of the weight plate when the weight plate moves, measure a reference distance between the component that does not move and the second laser sensor at a first time point, and measure a second distance between the component that does not move and the second laser sensor at a second time point that is different from the first time point, and wherein the processor is further configured to, by executing the at least one instruction, compensate a measurement error in the first distance detected by the first laser sensor caused by surrounding environmental conditions based on an amount of change or a change rate between the reference distance and the second distance.

2. The weight exercise apparatus of claim 1, wherein the second laser sensor is installed on the exercise main body.

3. The weight exercise apparatus of claim 2, wherein the exercise main body further comprises a frame structure supporting the plurality of weight plates to allow the plurality of weight plates to move, and the second laser sensor is arranged to irradiate the second laser beam toward a fixed region in the frame structure.

4. The weight exercise apparatus of claim 1, wherein the processor is further configured to control the user interface unit to display the user interface element on the user interface screen according to information detected by the first laser sensor based on whether a position of the weight plate moves, by executing the at least one instruction.

5. The weight exercise apparatus of claim 4, wherein the processor is further configured to compensate the measurement error in the first distance detected by the first laser sensor, by executing the at least one instruction, to:

determine a compensation factor by calculating the amount of change between the reference distance and the second distance detected by the second laser sensor; and determine a position of the weight plate by reflecting the determined compensation factor in the first distance detected by the first laser sensor.

6. The weight exercise apparatus of claim 1, wherein when the surrounding environmental conditions of the sensor module change, the first distance detected by the first laser sensor changes, and a change rate of the first distance detected by the first laser sensor is equal to a change rate between the second distance and the reference distance detected by the second laser sensor.

7. The weight exercise apparatus of claim 1, wherein when the surrounding environmental conditions of the sensor module change, the first distance detected by the first laser sensor changes, and an amount of change of the first distance detected by the first laser sensor is equal to the amount of change between the second distance and the reference distance detected by the second laser sensor.

8. The weight exercise apparatus of claim 1, wherein the first laser sensor and the second laser sensor have identical specifications.

9. The weight exercise apparatus of claim 8, wherein the first laser sensor and the second laser sensor have an identical measurement accuracy.

10. The weight exercise apparatus of claim 1, wherein the first laser sensor is arranged to irradiate the first laser beam toward a pin structure for weight setting of the weight exercise apparatus.

11. The weight exercise apparatus of claim 1, wherein the first laser sensor is arranged to irradiate the first laser beam toward a top surface of the weight plate.

12. The weight exercise apparatus of claim 6, wherein the surrounding environmental conditions comprise an ambient temperature or an ambient humidity of the sensor module.

13. A system to detect movement of a measurement target, the system comprising:

a sensor module comprising:

a first laser sensor configured to irradiate a first laser beam toward the measurement target or a component moving together with the measurement target to measure a first distance of the measurement target when the measurement target moves; and a second laser sensor configured to:

irradiate a second laser beam toward a component that does not move in spite of movement of the measurement target when the measurement target moves to measure a reference distance between the component that does not move and the second laser sensor at a first time point, and a second distance between the component that does not move and the second laser sensor at a second time point that is different from the first time point, a memory storing at least one instruction; and a processor configured to, by executing the at least one instruction, compensate a measurement error in the first distance measured by the first laser sensor caused by surrounding environmental conditions based on an amount of change or a change rate between the reference distance and the second distance.

* * * * *